Sept. 9, 1930.  E. J. WHALEN  1,775,619
HEADLIGHT
Filed Oct. 7, 1927  2 Sheets-Sheet 1
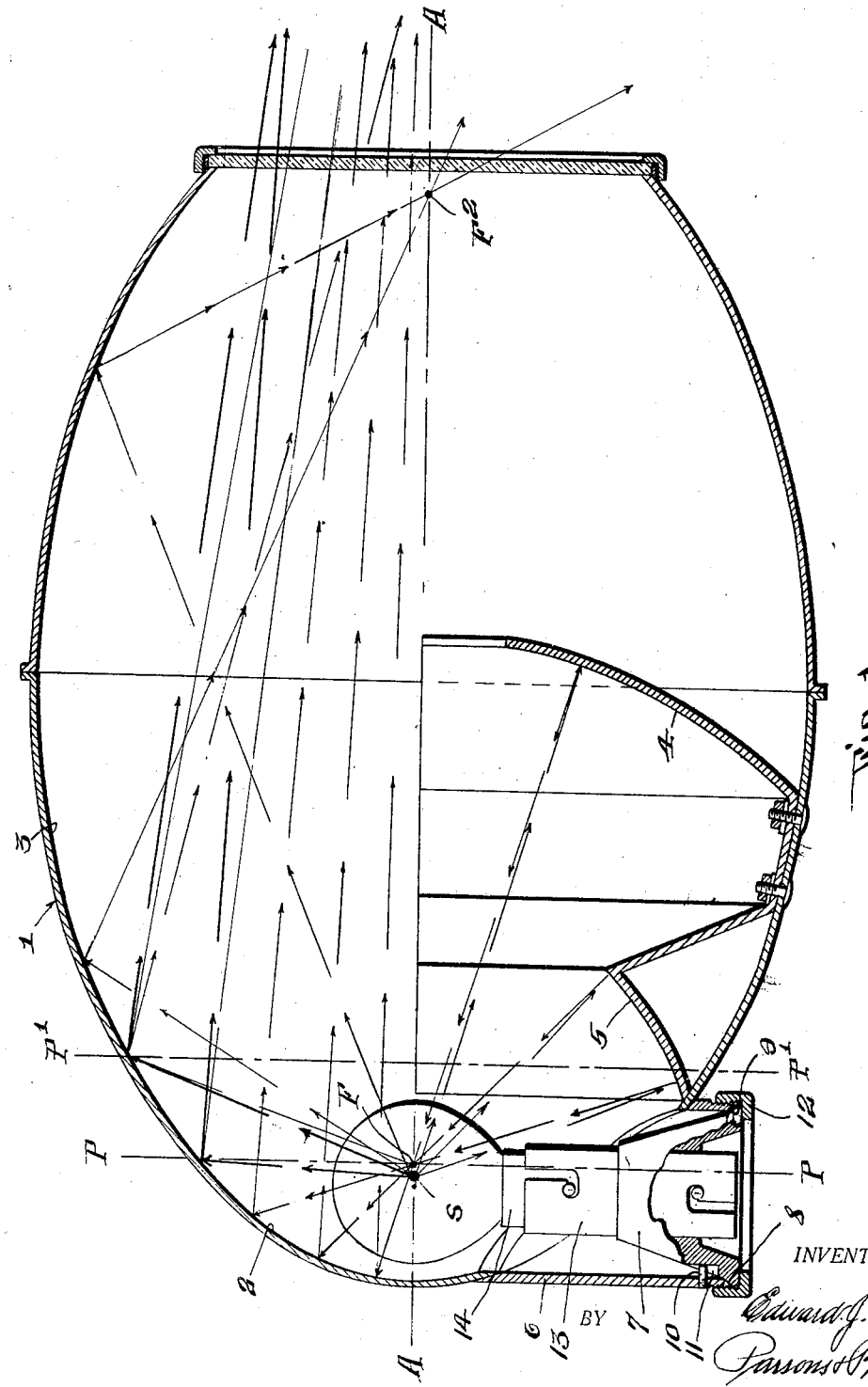

Sept. 9, 1930.   E. J. WHALEN   1,775,619
HEADLIGHT
Filed Oct. 7, 1927   2 Sheets-Sheet 2
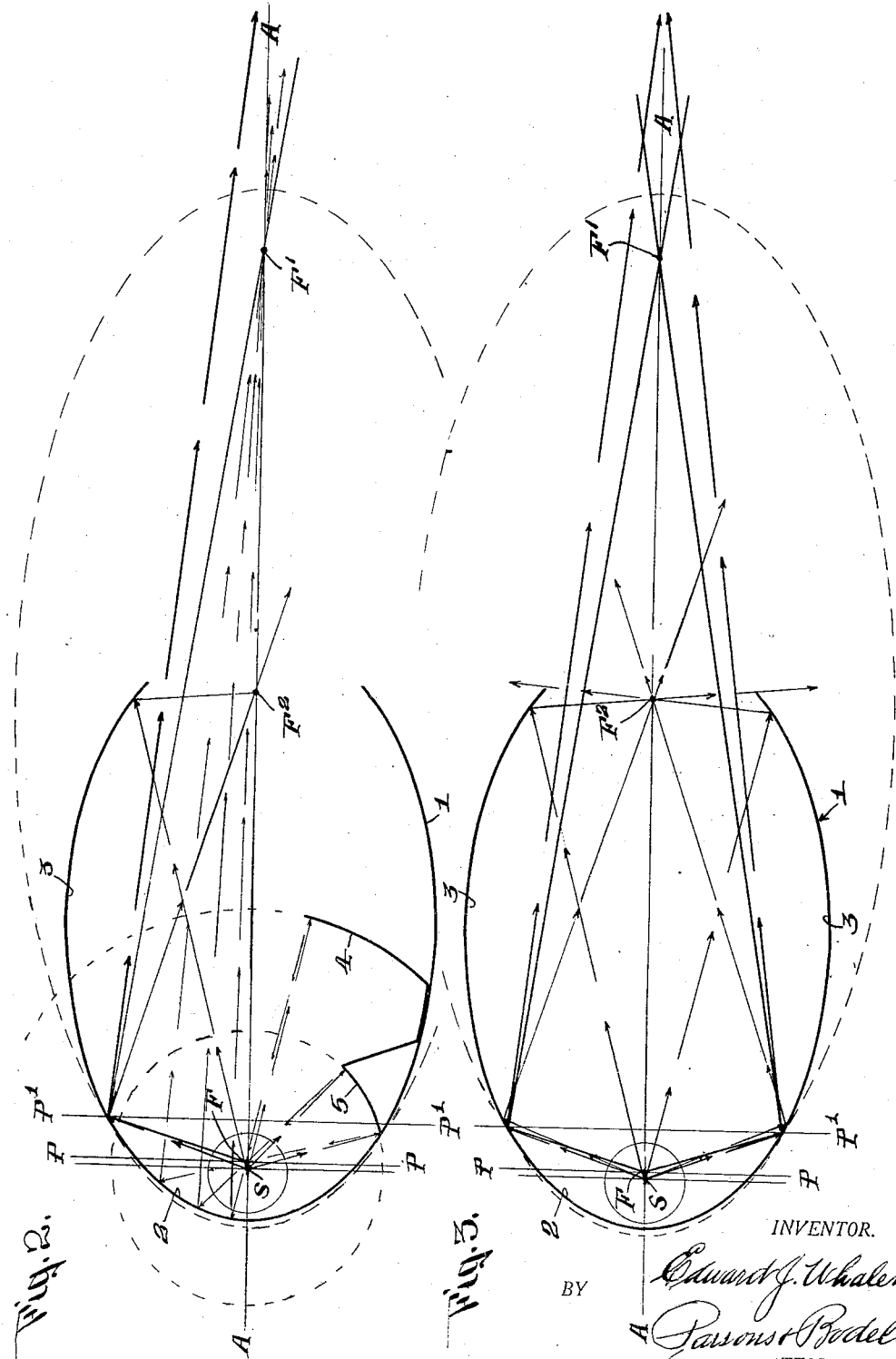
INVENTOR.
Edward J. Whalen
BY Parsons & Bodell
ATTORNEYS.

Patented Sept. 9, 1930

1,775,619

UNITED STATES PATENT OFFICE

EDWARD J. WHALEN, OF SYRACUSE, NEW YORK, ASSIGNOR TO REDIRECTED LIGHT CORPORATION OF AMERICA, OF SYRACUSE, NEW YORK, A CORPORATION OF NEW YORK

HEADLIGHT

Application filed October 7, 1927. Serial No. 224,694.

This invention relates to head lamps for vehicles and has for its object an arrangement of the source of light and reflectors or mirrors by which the greater part of the light is directed and redirected in a main beam from a small central part of a principal reflector located in the rear of the source of light and as close as possible thereto, without passing through the lamp filament.

The invention consists in the novel features and in the combinations and constructions hereinafter set forth and claimed.

In describing this invention, reference is had to the accompanying drawings in which like characters designate corresponding parts in all the views.

Figure 1 is a vertical sectional view of a headlight embodying my invention.

Figures 2 and 3 are diagrammatic views of this headlight.

I have discovered that because the source of light is finite and has dimensions, that it acts most efficiently when located in the rear of the theoretical focus of a reflector having a long major axis or short focal length and a comparatively short minor axis and that more rays are concentrated on the sharp curvature of the end of the ellipsoid directly in rear of the source of light than when located exactly in the focus of the ellipsoid and that hence, more rays are directed forwardly in rays which converge toward each other in the remote focus in lines inclined but slightly out of the horizontal, and that also, the locating of the source of light in the rear of the focus of the ellipsoid leaves this focus unobstructed for the passage of redirected rays back to the small central reflecting surface of sharp curvature in the rear of the source of light so that the greater part of the rays from the source of light are directed or redirected from the small end surface of the ellipsoid in the rear of and as close as possible to the source of light. The distance between the source of light and the end of the ellipsoid is limited only by the size of the commercial lamp bulbs.

This head lamp comprises generally a source of light, a principal reflector or mirror located in the rear of the source of light and of comparatively sharp curvature and having a focus, the reflector being located as close as possible to the source of light and the curvature being ellipsoidal or any other curvature which will project the rays in a beam converging in lines toward a focus located at a remote point in front of the headlight, a second ellipsoidal reflector concentric with the axis of the principal reflector and arranged in front of the source of light or in front of the vertical transverse plane of the source of light and above the horizontal plane of the axis and having its rear focus located in the axis of the reflector and in or near the source of light and its front focus near the front end of the lamp body, and a third reflector in the lower half of the body in front of the source of light and below the horizontal plane of the axis of the rear reflector and arranged with its focus in the actual focus of the rear reflector.

1 designates the body of the lamp which is ellipsoidal in general form, this body having a rear ellipsoidal reflector or mirror 2 having a relatively long major axis or short focal length and a comparatively short minor axis with its rear focus F located close to the rear end of the reflector and its front focus F' located at a remote point in advance of the head lamp.

In actual construction, the focal points F and F' are approximately 15½ inches apart with the focal point F located as near as possible as commercial lamps will permit to the reflector 2 in the focal axis A—A.

3 is the second reflecting surface or mirror on the inner side of the upper half of the body and above and in front of the source of light S, this reflector being ellipsoidal about the axis A—A and having its rear focus located near or in the source of light S and its front focus F² near the front end of the lamp body in the axis A—A.

The reflecting surface 2 preferably extends in front of the focal plane P—P and intersects the reflector 3 in the plane P'—P'.

4 and 5 designate additional reflectors which act as a third reflector, these being located in the lower half of the lamp body and below the horizontal plane of the axis A—A and arranged to reflect the light rays striking them rearwardly through the focus F.

The source of light S is arranged in the rear of the focus F so that the focus F is left unobstructed to the light rays reflected from the mirrors 4, 5. These mirrors 4, 5 are ellipsoidal and the foci of their ellipsoidal curve are located at F and in the source of light S as seen in Figure 2.

By placing the source of light in the rear of the back focus of the principal reflector 2 all redirected light is returned parallel to the main beam considerably increasing its intensity.

The non-coincidence of filament center and principal reflector focus which is here taken advantage of, occurs because of the finite size of the light source and the very short focal length of the principal reflector. As only the central part of this reflector, closest to the bulb, is active in forming the main beam, the focusing point for greatest intensity lies considerably in the rear of the reflector focus. The separation is sufficient for the redirected light returning through the back focus of the principal reflector to clear the filament entirely.

Also, owing to the arrangement of the source of light in the rear of the focus F and the nearness of the central part of the reflector 2 to the source of light, a fixed focus lamp can be used without varying to any practical extent, the efficiency of the light rays from the central rear end of the reflector 2.

It will be understood that the filaments in commercial lamps cannot be accurately located. One of the objects of my invention is to fix the position of the light source relatively to the focus so that in replacing the lamp, the operator cannot exercise any judgment but the filament will always come in a fixed point or in the neighborhood of a fixed point.

In the illustrated embodiment of my invention, the lamp body is provided with a tubular support 6 arranged at an angle to the axis A—A, it being preferably located vertically on the under side of the lamp at a right angle to the horizontal plane of the axis A—A, and the lamp mounting 7 and the tubular support 6 are constructed so that the mounting can receive the lamp only in one position and the mounting can be placed in the support only in one position.

The lamp mounting 7 is here shown as provided with a conical surface 8 near its lower end which fits and abuts against an internal conical surface 9 at the lower end of the tubular support 6 and these conical surfaces locate and center the lamp mounting and hence, the lamp and its filament.

The support 6 and the mounting is provided with interlocking means for preventing turning of the lamp mounting, this means being shown as a projection or pin 10 on the support which enters a single lengthwise groove 11 in the mounting. The support and mounting are held firmly in assembled relation with their conical surfaces fitted together by a ring 12 which threads on the lower end of the support 6 and abuts against the lower face of the mounting.

The mounting is provided with a suitable lamp socket 13 for receiving the lamp base 14, these two parts being connected together by the usual bayonet joint. Also, the mounting is provided with a similar socket for receiving the plug to which the wires are connected.

Owing to the arrangement of the reflector 2 to the source of light S relatively to the focus F, the relative arrangement of the redirecting mirrors 4, 5 to the focus F, a long concentrated beam of light which spreads out far in advance of the vehicle is formed, and owing to the reflector 3, a diffused wide light is projected near and directly in front of the vehicle.

Also, owing to the redirecting mirrors 4, 5 and the mirror 2 or the central part thereof, there are no glaring rays which can reach the eye of the pedestrian or the driver of an approaching vehicle, and because of the projection of the light glaring rays from approaching vehicles do not blind the driver of the vehicle provided with my headlights because the long concentrated beam of light illuminates clearly the road beyond the approaching vehicle.

What I claim is:

A headlight comprising an elongated body, a source of light, a reflector having front and rear foci, the front focus being located in front of the body of the headlight, the reflector being located in the rear of the source of light and close thereto, the source of light being located in the rear of the rear focus of the reflector, said reflector being constructed to project the light rays in lines converging out of the horizontal to the front focus, a second reflector ellipsoidal in form arranged in front of the transverse plane at a right angle to the axis of the first reflector and located near the rear focus, the second reflector being located above the horizontal plane of the axis of the first reflector, the second reflector having its rear focus located near the source of light and the second reflector being substantially a continuation of and merging into the first reflector where they are joined together and a third redirecting reflector arranged below said horizontal plane and having a single focus located near the source of light and arranged to redirect the rays of light onto the first reflector substantially through the rear focal point of the first reflector, the front focus of the second reflector being located in the rear of and remote from the front focus of the first reflector and near the front end of the body.

In testimony whereof, I have hereunto signed my name, at Syracuse, in the county of Onondaga, and in the State of New York, this 5th day of October, 1927.

EDWARD J. WHALEN.